United States Patent [19]
Braun

[11] 3,774,974
[45] Nov. 27, 1973

[54] SAFETY INSTALLATION FOR TWO-CIRCUIT BRAKE SYSTEMS, ESPECIALLY OF MOTOR VEHICLES

[75] Inventor: Erich Braun, Rielinghausen, Germany

[73] Assignee: Porsche K. G., Stuttgart-Zuffenhamsen, Germany

[22] Filed: June 14, 1972

[21] Appl. No.: 262,612

[30] Foreign Application Priority Data
June 22, 1971 Germany............... P 21 30 758.4

[52] U.S. Cl.............. 303/6 R, 303/84 A, 188/1 A
[51] Int. Cl............................................. B60t 13/00
[58] Field of Search.................... 303/6 R, 84 A; 188/1 A; 340/52 C

[56] References Cited
UNITED STATES PATENTS

| | | | |
|---|---|---|---|
| 3,626,366 | 12/1971 | Tam | 188/1 A |
| 3,627,385 | 12/1971 | Stokes | 303/84 A |
| 3,394,401 | 7/1968 | Roberts | 303/84 A |
| 3,560,058 | 2/1971 | Middleton | 303/84 A |
| 3,358,097 | 12/1967 | Kersting | 303/84 A |
| 3,382,333 | 5/1968 | Ihnacik, Jr. | 303/84 A |

*Primary Examiner*—Allen N. Knowles
*Attorney*—Paul M. Craig, Jr. et al.

[57] ABSTRACT

A safety installation for two-circuit brake systems, especially of motor vehicles, in which two mutually independent brake circuits, each equipped with its own line system and independent wheel brake cylinders, is supplied with pressure fluid by a master brake cylinder constructed as tandem-cylinder with pistons movable with respect to one another; a closure mechanism common to both brake circuits is thereby connected directly in the output of the master brake cylinder which in case of pressure loss in one brake circuit automatically closes the pressure medium supply into the ineffective brake circuit during the actuation of the brake system by the pressure that builds up in the effective brake circuit.

37 Claims, 4 Drawing Figures

SAFETY INSTALLATION FOR TWO-CIRCUIT BRAKE SYSTEMS, ESPECIALLY OF MOTOR VEHICLES

The present invention relates to a safety installation for two circuit brake systems, especially of motor vehicles, in which two mutually independent brake circuits, of which each is equipped with its own line system and with independent wheel brake cylinders, is supplied with pressure fluid by a master brake cylinder constructed as tandem-cylinder having pistons movable with respect to one another.

Hydraulic brake systems of motor vehicles are constructed to an ever increasing extent as so-called two-circuit brake systems whose two brake circuits each consist of an independent line system with its own wheel brake cylinders and which are adapted to be acted upon with pressure medium by means of a brake pedal acting on a master brake cylinder constructed as tandem-cylinder and including two separate pressure chambers. With such types of brake systems, in case of loss of one brake circuit, the effectiveness of the second brake circuit is maintained so that a braking of the motor vehicle continues to be assured.

For two circuit brake systems various safety valves are already known in the prior art which are connected into the line systems and which serve for the disconnection of a line branch exhibiting an excessive pressure drop, whereby in case of a defect in one line branch, the loss of the entire brake circuit is prevented. In one known type of construction of such a safety valve (British Pat. No. 839,349), a stepped piston by-passed by a by-pass line and acted upon on both sides with the line pressure is interconnected in each line branch which, under normal conditions is maintained in a position opening up the discharge aperture of the by-pass line by way of the line pressure acting on its larger piston surface and an abutment. In case of a collapse of the line pressure downstream of the stepped or differential piston, the latter is displaced under the effect of the line pressure acting on its smaller piston area into a closing position closing the discharge aperture of the by-pass line so that the corresponding line branch is closed off. In a further known prior art safety valve (British Pat. No. 978,933), two pistons are floatingly arranged in a cylinder housing on both sides of a central piston chamber delimited by abutments, which pistons, on the other, act on a respective liquid volume connected with the line branches so that in case of a pressure increase within the central pressure chamber produced by a master brake piston, a pressure is also being built up in the connected line branches. In case of loss of a line branch, the piston coordinated thereto is displaced without resistance up to its end stop at the cylinder housing wall which also entails a temporary relief of the other piston coordinated to the further line branch; however, the latter is again acted upon with the full brake pressure as soon as the one piston has reached its end stop. With these prior art safety valves, in addition to a decrease of the brake power output adapted to be produced, a considerably increased brake pedal travel has to be always accepted which leads to a delay of the braking operation. For these reasons, the known safety valves did not prove successful in the motor vehicle industry.

The aim of the present invention, in contradistinction thereto, resides in creating a safety installation for two circuit brake systems of motor vehicles, in which an increase of the brake pedal path and therewith a delay of the braking operation is avoided.

The underlying problems are solved according to the present invention in that a closure mechanism common to both brake circuits is connected directly in the output of the master brake cylinder, which in case of pressure loss in one brake circuit automatically blocks or closes the pressure medium supply into the ineffectual or inoperable brake circuit by the pressure building up during the actuation of the brake system in the effectual or operable brake circuit. As an increased safety feature each brake circuit is separated from the master brake cylinder by means of the closure mechanism in the normal condition of the brake system having two effective or operable brake circuits and is connected with a respective pressure medium supply tank by way of one return line each. Preferably, during the actuation of the brake system with two effective or operable brake circuits, each brake circuit is connected wtih the master brake cylinder by means of the closure mechanism and the return lines are closed. According to a preferred embodiment of the present invention, the closing and the opening of the return lines takes place by displacement of two shifting pistons. Preferably, each operable brake circuit is connected with the master brake cylinder by way of a twin piston common to both brake circuits. Advantageously, the closing off of the inoperable brake circuit takes place by displacement of a twin piston common to both brake circuits. The twin piston is retained in its respective position in an extraordinarily advantageous manner by a detent mechanism. Further advantages are achieved in that the closure mechanism includes a contact switch which is actuated by the displacement of the twin piston and that the closing off of the inoperable brake circuit is indicated by the closing of the electric circuit of an optical and/or acoustic warning device. Appropriately, the contact switch may be included in a detent mechanism. An advantageous embodiment of the present invention is constructed in such a manner that the closure mechanism includes a housing with a cylinder bore, in which terminate two inlet bores, two outlet bores and four return bores, in which with two operable brake circuits, a twin piston adjoined by two shifting pistons is floatingly retained in a center position by means of two compression springs and a springy detent mechanism, in which with a pressure loss in one brake circuit, the operating pressure of the operable brake circuit which builds up, displaces the twin piston as well as the shifting pistons, in which during its displacement, the twin piston presses two detent pins into the housing out of a detent groove and a detent pin closes thereat a contact switch actuating a warning light, in which the displaced twin piston closes off the outlet bores of the inoperable brake circuits and the displaced shifting pistons close off two return bores, in which by reengagement of the detent pins in a further adjacent detent groove of the double piston, both the twin piston as also the shifting piston of the inoperable brake circuit are retained in the closing position and in which the shifting piston of an inoperable brake circuit after termination of the braking operation again keeps closed the outlet bore of an operable brake circuit under the pressure of the coordinated compression spring and keeps open again the return bore.

The advantages achieved by the present invention consist especially in that by the coordination of a closure mechanism common to both brake circuits which in case of a loss of a brake circuit prevents a pressure medium supply from the master brake cylinder into the inoperable brake circuit, the pressure medium column in front of or upstream of the piston of the inoperable brake circuit remains preserved in a manner similar to an operable brake circuit. Since the closing starts immediately with the beginning of the brake actuation and is terminated after overcoming the customary vent play of the wheel brake cylinders of the operable brake circuit, the brake pedal path remains the same as with the brake system having two operable brake circuits. The speed of the braking operation also remains the same which signifies an increase of the safety.

These and further objects, features and advantages of the present invention will become more apparent from the following description when taken in connection with the accompanying drawing which shows, for purposes of illustration only, one embodiment in accordance with the present invention, and wherein:

Figure 1:
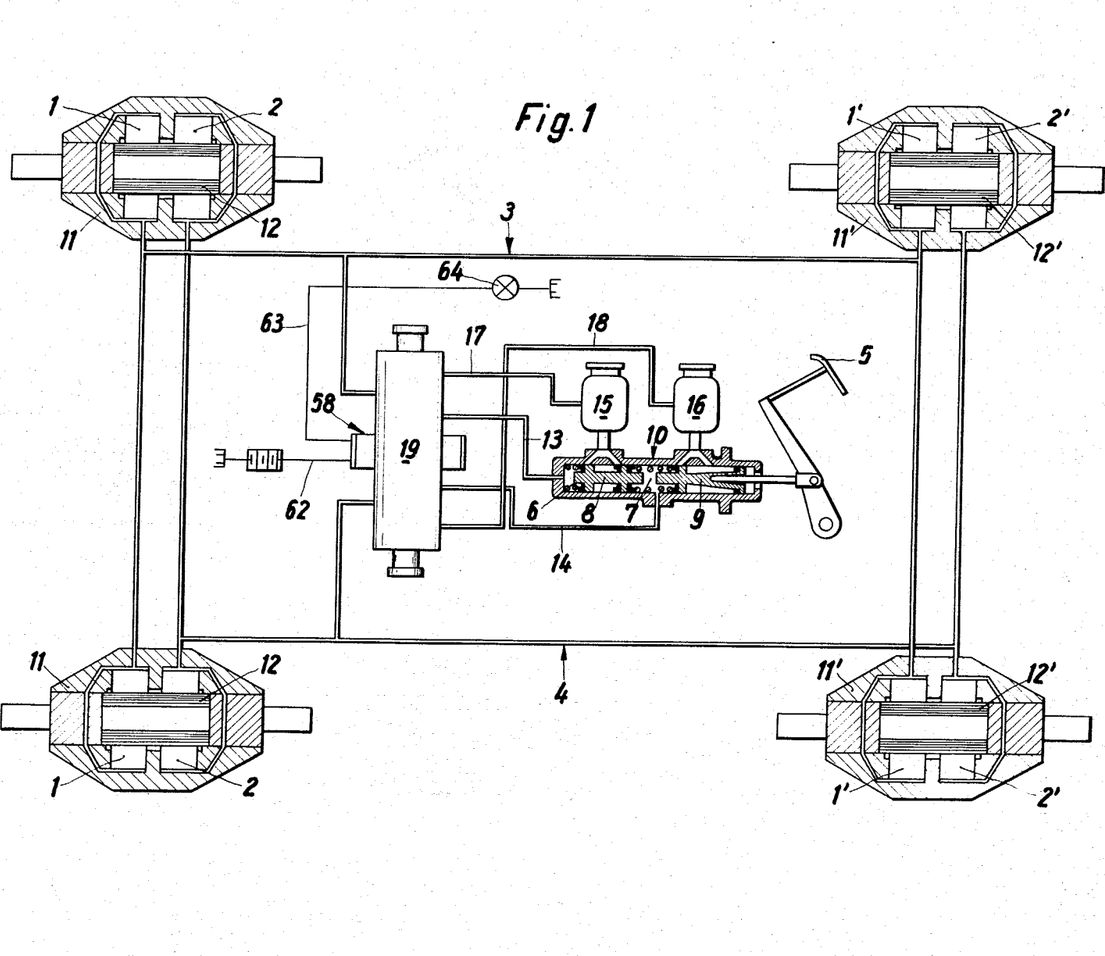
FIG. 1 is a schematic view of a safety installation according to the present invention equipped with a full two-circuit brake system of a motor vehicle.

Referring now to the drawing wherein like reference numerals are used throughout the various views to designate like parts, and more particularly to FIG. 1, in the two-circuit brake installation illustrated in this figure which is utilized especially for high-powered motor vehicles, there are provided two mutually independent line systems forming together with the wheel brake cylinders 1, 1' and 2, 2', one brake circuit each, generally designated by reference numerals 3 and 4, respectively, which are supplied with pressure fluid by a master brake cylinder 10 actuatable by means of a brake pedal 5 and constructed as tandem-cylinder constituted by two separate pressure chambers 6 and 7 with two master brake pistons 8 and 9 arranged at a distance from one another. The wheel brake cylinders 1, 1' and 2, 2' at the wheel axles are arranged respectively independently of one another in the brake saddles 11, 11' of the disk brakes pairwise on both sides of the brake disk and actuate, respectively, a common brake lining carrier 12, 12'. A closure mechanism 19 according to the present invention which is arranged downstream, i.e., in the output of the master brake cylinder 10 and which is connected with the pressure chambers 6 and 7 thereof by way of line sections 13 and 14 as well as with the supply tanks 15 and 16 by way of line sections 17 and 18, is interconnected in the brake system.

Figure 2:
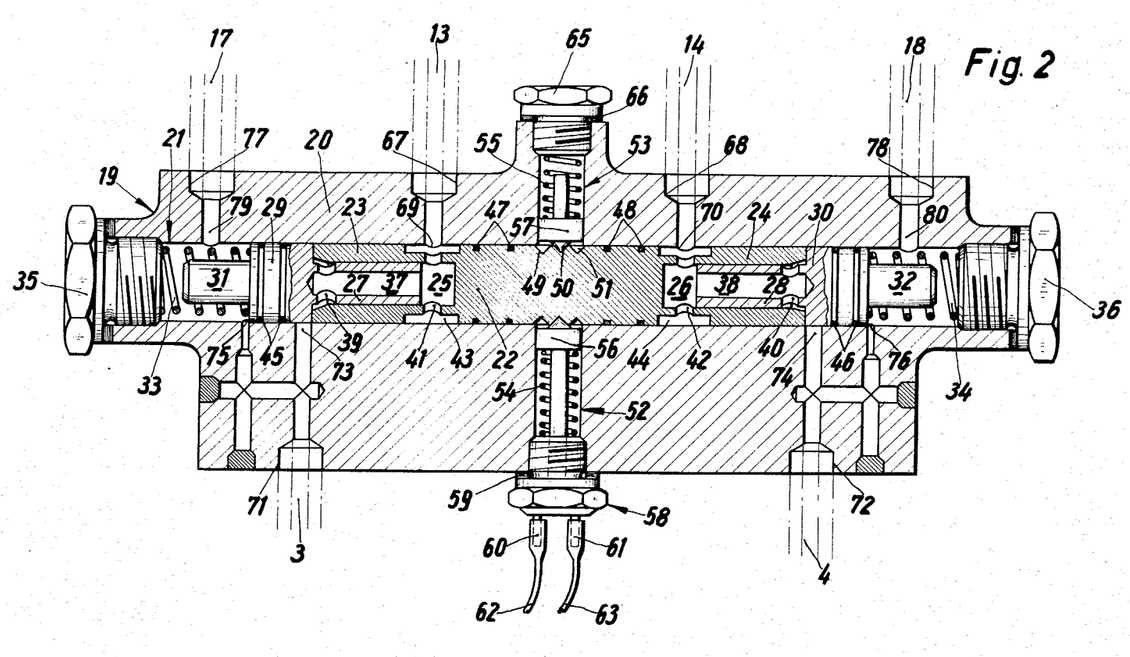
FIG. 2 is a longitudinal cross-sectional view through the safety mechanism of the brake system of the present invention according to FIG. 1, on an enlarged scale.

The closure mechanism 19 is illustrated in FIG. 2 in the normal rest position with two closed, i.e., therefore effective or operable brake circuits 3 and 4. The closure mechanism 19 consists of a housing 20 with a cylinder bore 21. A double or twin piston 22 is floatingly supported in the cylinder bore 21. The twin piston 2 includes in its two end areas 23 and 24 one central bore 25 and 26 each, within which a respective section 27 and 28 of a change-over or shifting piston 29 and 30 is slidingly guided. Both shifting pistons 29 and 30 are also slidingly supported in the cylinder bore 21. The shifting pistons 29 and 30 include pins 31 and 32 which are received by compression springs 33 and 34 which, on the one hand, are supported against the shifting pistons 29 and 30 and on the other, under prestress against threaded closure plugs 35 and 36 of the cylinder bore 21. The sections 27 and 28 of the shifting pistons 29 and 30 which are guided in the twin piston 22, are provided with a central bore 37 and 38 as well as with a radial bore 39 and 40 which are in communication with the central bores 37 and 38. The bores 25 and 26 are in communication by way of radial bores 41 and 42 of the twin piston 22 with annular grooves 43 and 44 of the twin piston 22. The twin piston 22 and the shifting pistons 29 and 30 are sealed off with repect to the cylinder bore 21 by means of sealing rings 45, 46, 47 and 48. The twin piston 22 includes V-shaped detent grooves 49, 50 and 51 intermediate the seals 47 and 48, into which can engage detent pins 56 and 57 radially slidably supported in the housing bores 52 and 53 and subjected to the pressure of compression springs 54 and 55. The detent pin 56 acts on a contact switch 58 which is screwed into the housing bore 52 and seals the same by means of a seal 59. The contact switch 58 is a conventional make-and-brake switch, whose working contact is alternately closed or opened upon its actuation. Two plug contacts 60 and 61 project out of the contact switch 58. An electric line 62 leads from the plug contact 60 to a voltage source (not shown in detail) of the vehicle. An electric line 63 leads from the plug contact 61 to a warning light 64 (FIG. 1) arranged within the field of vision of the vehicle driver. The housing bore 53 is closed off by means of a closure bolt 65 and a seal 66. Two connecting bores 67 and 68 are provided in the housing 20 for the line branches 13 and 14; these connecting bores 67 and 68 continue with reduced cross section within the housing 20 and enter into the cylinder bore 21 within the area of the annular grooves 43 and 44 as inlet bores 69 and 70. Furthermore, connecting bores 71 and 72 are provided for the brake circuits 3 and 4 within the area of the shifting pistons 29 and 30. The connecting bores 71 and 72 continue with reduced cross section within the housing 20, branch off and enter the cylinder bore 21, on the one hand, within the area of the shifting pistons 29 and 30 as outlet bores 73 and 74 and, on the other, within the area of the pins 31 and 32, again reduced in cross section as return bores 75 and 76. Connecting bores 77 and 78 are provided in the housing 20 for the return lines 17 and 18, which enter into the cylinder bore 21 within the area of the pins 31 and 32 as return bores 79 and 80.

OPERATION

Figure 3:
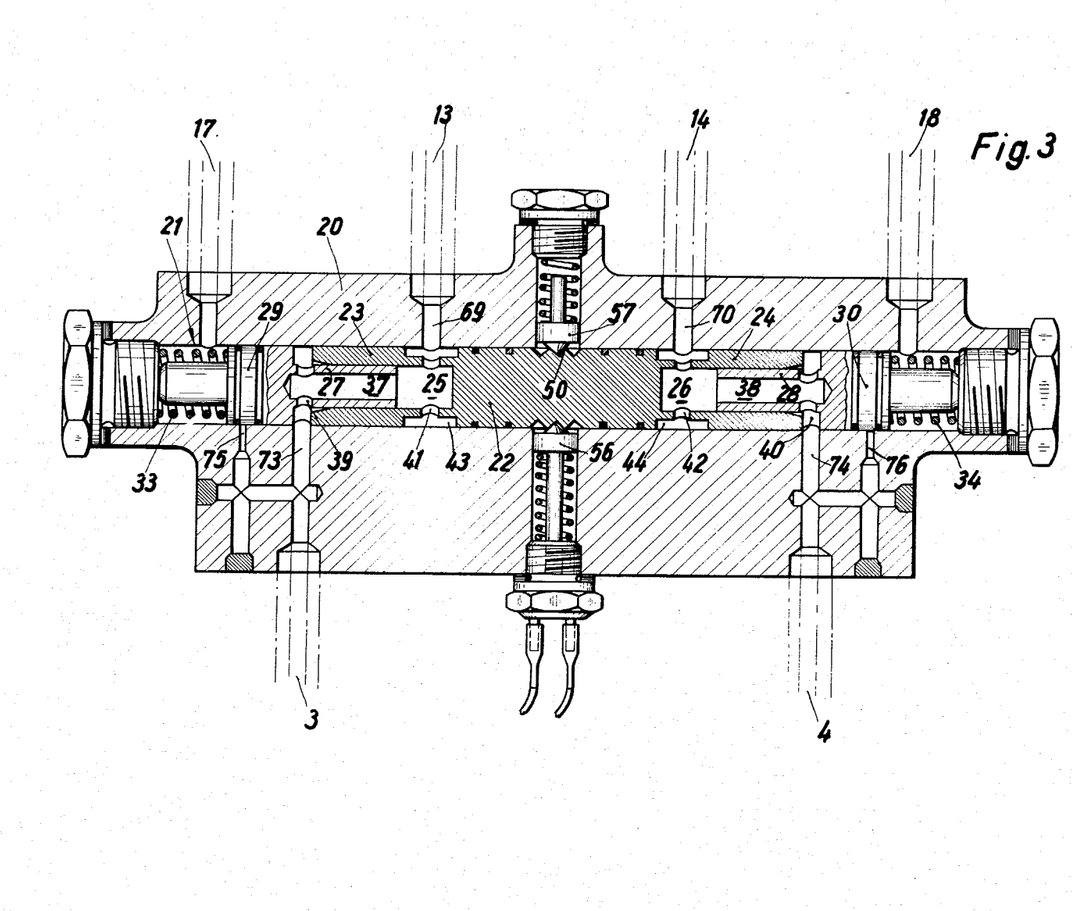
FIG. 3 is a longitudinal cross-sectional view through the safety mechanism of the present invention according to FIG. 1, similar to FIG. 2 but illustrating the same during the actuation of the brake system with two operable brake circuits.

The operation of the safety installation according to the present invention will now be explained by reference to FIGS. 1 to 4. With a properly operating brake system (FIGS. 1 to 3), the same pressure builds up in both line branches 13 and 14 during the actuation of the brake pedal 5, and the pistons 8 and 9 press the pressure medium through the inlet bores 69 and 70 into the cylinder bore 21 of the housing 20. The pressure medium flows through the annular grooves 43 and 44 and reaches the axial bores 25 and 26 within the end areas 23 and 24 of the twin piston 22 by way of the radial bores 41 and 42. From the axial bores 25 and 26, the pressure medium reaches the central bores 37 and 38 of the sections 27 and 28 of the shifting pistons 29 and 30 supported in the axial bores 25 and 26, which close the axial bores 25 and 26 (FIG. 2) under the pressure of the compression springs 33 and 34. With an increasing operating pressure during the actuation of the brake system, the pressure medium in the twin piston 22 displaces the shifting pistons 29 and 30 away from the end areas 23 and 24 against the force of the compression springs 33 and 34. As a result thereof, the pressure medium can flow through the outlet bores 73 and 74 by way of the radial bores 39 and 40 provided in the sections 27 and 28 of the shifting pistons 29 and 30. The displaced shifting pistons 29 and 30 close off the return bores 75 and 76 so that a pressure builds up (FIG. 3) in the brake circuits 3 and 4 by way of the outlet bores 73 and 74. All wheel brake cylinders 1, 1' and 2, 2' are acted upon and in turn act on the brake lining carriers 12 and 12' which come into frictional engagement with the brake disks and brake the vehicle (FIG. 1). After termination of the braking operation, the compression springs 33 and 34 again force the shifting pistons 29 and 30 into the initial position (FIG. 2). The shifting pistons 29 and 30 thereby close, on the one hand, the outlet bores 73 and 74 while, on the other, the return lines 75 and 76 are opened up simultaneously. As a result thereof, the pressure medium can flow back from the brake circuits 3 and 4 through the cylinder bore 21 by way of the return bores 79 and 80 and by way of the return lines 17 and 18 into the supply tanks 15 and 16 (FIG. 1). Simultaneously therewith, the pressure chambers 6 and 7 of the master brake cylinder 10 suck pressure medium out of the supply tank 15 and 16. During the entire braking operation with two closed, operable brake circuits 3 and 4, the twin piston 22 maintains its center position due to he same load on the shifting pistons 29 and 30. Smaller occurring pressure differences on the twin piston 22—for example, due to a shifting piston 29 or 30 which moves more slowly or due to a difference of the spring constants of the springs 33 and 34—are thereby absorbed trouble-free by the detent pins 56 and 57 which are engaged in the detent groove 50 (FIG. 3).

Figure 4:
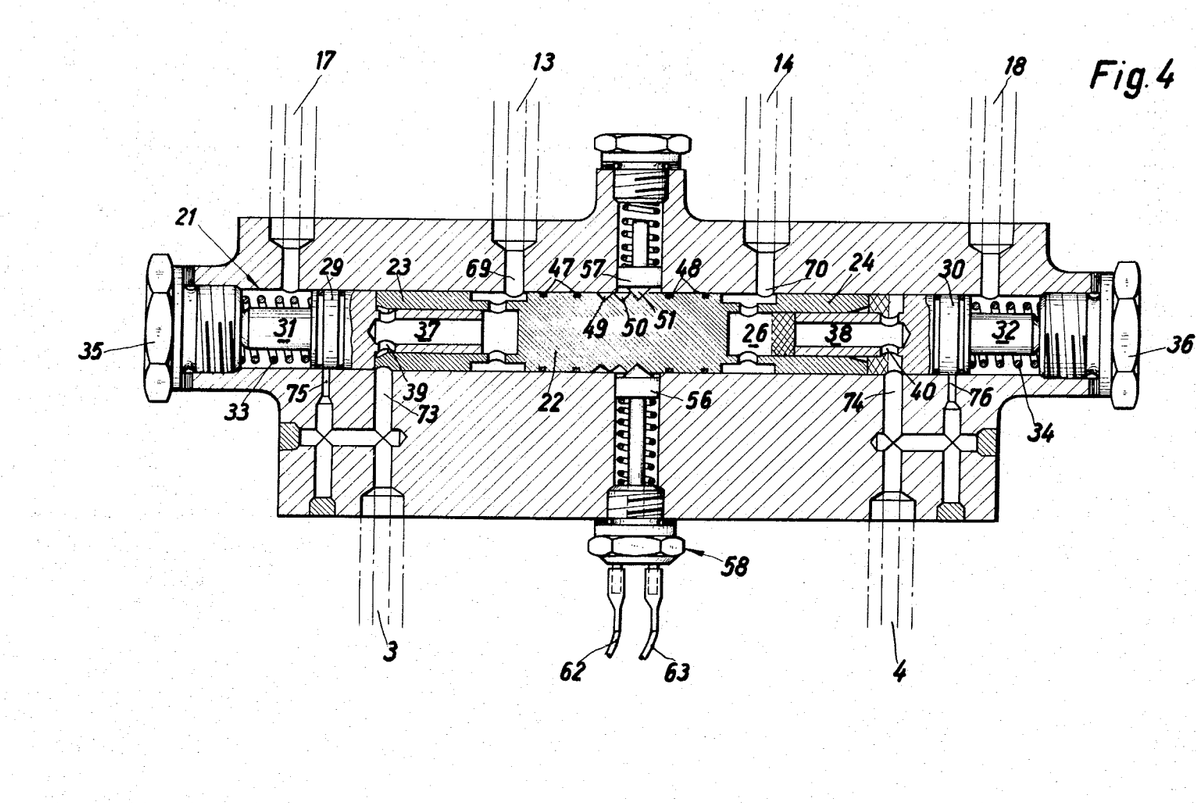
FIG. 4 is a longitudinal cross-sectional view through a safety mechanism of the present invention according to FIG. 1, similar to FIGS. 2 and 3 but illustrating the same during the actuation of the brake system with one inoperable brake circuit.

In the following, the operation of the brake system in case of loss of the brake circuit 3 will be described by reference to FIG. 4. As during the braking operation with two effective brake circuits, during the actuation of the brake pedal 5 pressure medium reaches the cylinder bore 21 by way of the inlet bores 69 and 70. The shifting pistons 29 and 30 are forced with their pins 31 and 32 against the force of the compression springs 33 and 34 up to the closure bolts 35 and 36 and close off the return bores 75 and 76. The pressure medium supplied through the supply line 13 initially escapes ineffectually through the bores 37 and 39 out of the cylinder bore 21 by way of the outlet bore 73 into the defective inoperable brake circuit 3. A pressure builds up very rapidly between the twin piston 22 and the shifting piston 30, which continues in the brake circuit 4 by way of the outlet bore 74. The wheel brake cylinders 2 and 2' are acted upon and in turn act on the brake lining carriers 12 and 12' which come into frictional engagement with the brake disks and thus brake the vehicle (FIG. 1). Already for overcoming the always-present vent play—above all, between the brake lining and the brake disk—a certain pressure builds up in the cylinder bore 21 between the twin piston 22 and the shifting piston 30. The pressure reaches a value that suffices to overcome all frictional forces engaging at the twin piston 22. These frictional forces occur predominantly at the seals 47 and 48 as well as in the detent groove 50 and act opposite the pressure between the twin piston 22 and the shifting piston 30. If the friction forces are overcome, only a further slight pressure increase is necessary in order to cause the twin piston 22 to abut at the shifting piston 29; for also a slight pressure builds up between the shifting pitson 29 and the twin piston 22 which, however, escapes continuously through the outlet bore 73 into the pressureless, inoperable brake circuit 3. As a result of this displacement of the twin piston 22 against the force of the compression spring 33, two things are achieved:

The displaced twin piston 22 closes with the section 23 the outlet bore 73 and the detent pins 56 and 57 slide out of the detent groove 50 and engage into the detent groove 51. When sliding out of the detent groove 50, the detent pin 56 actuates the contact switch 58 which, by closing the circuit 62 and 63 causes the warning lamp 64 to light up within the field of vision of the vehicle driver (FIG. 1). When the vent play in the brake circuit 4 is overcome, the outlet bore 73 is completely closed by the area 23 of the twin piston 22. The pressure medium column in front, i.e., upstream of the master brake piston 8, especially in the pressure chamber 6 (FIG. 1) remains preserved during the further braking operation. During the displacement, the twin piston 22 has released a further additional space in the bore 26 as well as in the cylinder bore 21 between the section 24 and the shifting piston 30 (indicated by the double-cross-hatching in FIG. 4). This space is supplied with pressure medium from the inlet line 14 while overcoming the vent play in the brake circuit 4 and thus during the displacement of the twin piston 22. Extensive tests have clearly demonstrated that the pressure medium volume, which can escape out of the ineffectual brake circuit 3 during the closing operation, together with the pressure medium volume which fills out this additional space in the cylinder bore 21 indicated by double-cross-hatching, corresponds approximately to the pressure medium volume which is required with a properly functioning brake system having two operable brake circuits 3 and 4 in order to overcome the vent play of the brake circuit 3 and in order to actuate the wheel brake cylinders 1 and 1'. Consequently, the entire brake pedal path or travel has not increased after the loss of the brake circuit 3 due to the closing action, starting immediately at the beginning of the actuation of the brake system.

After the termination of the braking operation in the brake system with the lost brake circuit 3 (FIG. 4), the detent pins 56 and 57 hold the twin piston 22 against the force of the compression spring 33 in an eccentric closing position. The shifting piston 29 remains in a position closing the return bore 75 so that no pressure medium can continue to flow off into the defective, inoperable brake circuit 3 by way of the bore 39 out of the supply tank 15. The compression spring 34 causes the shifting piston 30 to abut at the twin piston 22. As a result thereof, the outlet bore 74 is closed and the pressure medium of the brake circuit 4 can flow in part through the released or opened-up return bore 76 into the supply tank 16 by way of the return line 18 (as in FIG. 2). The additional pressure medium volume (indicated by double-cross-hatching) returns into the pressure chamber 7 by way of the line 14. During the return of the brake pedal 5 into the initial position, the master brake pistons 8 and 9 are relieved and pressure medium is sucked in out of the supply tanks 15 and 16 into the pressure chambers 6 and 7 while the master brake pistons 8 and 9 move back into their original position. By this operation the pressure medium column is also fully re-established in fornt of, i.e., upstream of the master brake piston 8. Under the assumption that the outlet bore 73 is closed off fluid-tight by the twin piston 22, the brake pedal path—in case of a renewed actuation of the brake system—is shorter than with the actuation of the properly operating brake system with two operable brake circuits 3 and 4. This can be explained as follows: During each additional actuation of the brake system with displaced twin piston 22 (FIG. 4), no leakage oil is lost any longer through the inoperable brake circuit 3 so that the master brake piston 9 directly actuates the brake circuit 4 by way of the bores 70, 26, 38, 40, 21 and 74. In contrast thereto, the piston 8 remains in its original position so that this piston travel is economized. It is true that the shifting piston 30 now has to traverse an additional path (indicated by the space in double-cross-hatching in FIG. 4) against the compression spring 34 until it releases the outlet bore 74. However, this volume is not as large as the volume which the master brake piston 8 has to supply with a properly functioning brake system having two operable brake circuits 3 and 4 in order to eliminate the vent play of the brake circuit 3. Since additionally one has to reckon with a leakage oil quantity—even though small—the travel of the brake pedal 5 after the loss of the brake circuit 3 remains at least equal to the travel of the brake pedal 5 with two operable brake circuits 3 and 4.

The described operation in case of loss of the brake circuit 3 is valid analogously also in case of a loos of the brake circuit 4. In that case, upon actuation of the brake pedal 5, the twin piston 22 moves toward the shifting piston 30 and closes the outlet bore 74. The dentent pins 76 and 77 engage into the detent groove 49 and hold the twin piston 22 in the closing position. The contact switch 58 is closed and the warning lamp 64 lights up. The brake circuit 3 is fully actuated and acts on the brakes. Also, the further operation corresponds to the operation described above in an analogous manner.

While I have shown and described only one embodiment in accordance with the present invention, it is understood that the same is not limited thereto. For example, in addition to he described embodiment of the present invention, especially a construction is also possible in which the master brake cylinder 10 and the housing 20 of the closure mechanism of the present invention are combined structurally, for example, into a single housing. Furthermore, the combination of the closure mechanism according to the present invention with a conventional servo-mechanism for the operable brake circuit is particularly advantageous. In the latter case, not only the brake pedal path remains the same in case of loss of a brake circuit, but also the brake force at the wheels of the vehicle.

Thus, I do not wish to be limited to the details shown and described herein but intend to cover all such changes and modifications as are encompassed by the scope of the appended claims.

I claim:

1. A safety installation for two-circuit brake systems, especially of motor vehicles, in which two brake circuit means independent of one another, of which each brake circuit means includes its own line system and independent wheel brake cylinders, is supplied with pressure fluid by a master brake cylinder means, characterized by a closure means common to both brake circuit means and connected in the output of the master brake cylinder means, said closure means including control means operable in case of pressure loss in one brake circuit means to automatically close the pressure medium supply into said one inoperable brake circuit means by the pressure which builds up during actuation of the brake system in the other operable brake circuit means, characterized in that in the normal condition of the brake system with two operable brake circuit means, each brake circuit means is separated from the master brake cylinder means by the closure means and is connected with a respective pressure medium tank by way of a corresponding return line.

2. A safety installation according to claim 1, characterized in that the master brake cylinder means is constructed as tandem cylinder equipped with two master brake pistons movable with respect to each other.

3. A safety installation according to claim 1, characterized in that during the actuation of the brake system with two operable brake circuit means, each brake circuit means is connected with the master brake cylinder means by means of the closure means while the return lines are closed thereby.

4. A safety installation according to claim 3, characterized in that the closing and opening of the return lines takes place by displacement of two shifting piston means forming part of the control means.

5. A safety installation according to claim 4, characterized in that each operable brake circuit means is connected with the master brake cylinder means by way of a twin piston means common to both brake circuit means and forming part of the control means.

6. A safety installation according to claim 5, characterized in that the closing off of the inoperable brake circuit means takes place by displacement of the twin piston means common to both brake circuit means and forming part of the control means.

7. A safety installation according to claim 6, characterized in that the twin piston means is retained in its respective position by a detent means.

8. A safety installation according to claim 7, characterized in that the detent means includes a contact switch which is actuated by displacement of the twin piston means and which indicates the closing off of the inoperable brake circuit means by the closing of an electric circuit means for a warning device.

9. A safety installation according to claim 8, characterized in that the warning device includes an optical warning device.

10. A safety installation according to claim 9, characterized in that the warning device includes an acoustic warning device.

11. A safety installation according to claim 8, characterized in that the contact switch is included in the detent means.

12. A safety installation according to claim 11, characterized in that the closing means includes a housing provided with a cylinder bore, two inlet bores, two outlet bores and four return bores terminating in said cylinder bore, the twin piston means adjoined by the two shifting piston means being retained floatingly in a center position by means of two compression springs and the elastic detent means when the two brake circuit means are operable.

13. A safety installation according to claim 11, characterized in that in case of pressure loss in a brake circuit means, the operating pressure of the other operable brake circuit means which builds up displaces the twin piston means as well as the shifting piston means.

14. A safety installation according to claim 13, characterized in that the twin piston means during its displacement forces two detent pin means of the detent means out of a detent groove into the housing and in that a detent pin closes thereat a contact switch actuating a warning lamp.

15. A safety installation according to claim 14, characterized in that the displaced twin piston means closes off the inoperable brake circuit means and the displaced shifting piston means close off two return lines.

16. A safety installation according to claim 15, characterized in that the twin piston means as well as the shifting piston means of an inoperable brake circuit means are kept in the closing position by the reengagement of the detent pins in a further adjacent detent groove of the twin piston means.

17. A safety installation according to claim 16, characterized in that the shifting piston means of an operable brake circuit means after termination of the braking operation again keeps closed the outlet bore of an operable brake circuit means under the pressure of the coordinated compression spring and again keeps open the return line.

18. A safety installation according to claim 1, characterized in that the closing and opening of the return lines takes place by displacement of two shifting piston means forming part of the control means.

19. A safety installation for two-circuit brake systems, especially of motor vehicles, in which two brake circuit means independent of one another, of which each brake circuit means includes its own line system and independent wheel brake cylinders, is supplied with pressure fluid by a master brake cylinder means, characterized by a closure means common to both brake circuit means and connected in the output of the master brake cylinder means, said closure means including control means operable in case of pressure loss in one brake circuit means to automatically close the pressure medium supply into said one inoperable brake circuit means by the pressure which builds up during actuation of the brake system in the other operable brake circuit means, characterized in that the closing means includes a housing provided with a cylinder bore, two inlet bores, two outlet bores and four return bores terminating in said cylinder bore, a twin piston means adjoined by two shifting piston means being retained floatingly in a center position by means of two compression springs and an elastic detent means when the two brake circuit means are operable.

20. A safety installation according to claim 19, characterized in that in case of pressure loss in a brake circuit means, the operating pressure of the other operable brake circuit means which builds up displaces the twin piston means as well as the shifting piston means.

21. A safety installation according to claim 20, characterized in that the twin piston means during its displacement forces two detent pin means of the detent means out of a detent groove into the housing and in that a detent pin closes thereat a contact switch actuating a warning lamp.

22. A safety installation according to claim 21, characterized in that the displaced twin piston means closes off the inoperable brake circuit means and the displaced shifting piston means close off two return lines.

23. A safety installation according to claim 22, characterized in that the twin piston means as well as the shifting piston means of an inoperable brake circuit means are kept in the closing position by the reengagement of the detent pins in a further adjacent detent groove of the twin piston means.

24. A safety installation according to claim 23, characterized in that the shifting piston means of an operable brake circuit means after termination of the braking operation again keeps closed the outlet bore of an operable brake circuit means under the pressure of the coordinated compression spring and again keeps open the return line.

25. A safety installation for controlling brake fluid flow from a plurality of separately supplied brake fluid input lines to a corresponding plurality of brake fluid output lines which lead respectively to a corresponding plurality of independently actuable wheel brake cylinders at a wheel to be braked; said installation comprising:

a control valve housing,
first and second separately supplied brake fluid input lines leading into said valve housing,
first and second output lines leading out of said valve housing for separately supplying brake fluid pressure to respective first and second independently actuable wheel brake cylinders at a wheel to be braked,
control piston means movably disposed in said valve housing and including means for permitting communication of said first input line with said first output line and of said second input line with said second output line when approximately equal brake fluid pressure buildup is experienced in said first and second output lines corresponding to normally functioning respective first and second brake circuits containing said respective first and second output lines, said control piston means including further means for automatically closing off the communication of the respective input and output lines of one of said brake circuits by way of the pressure buildup in the output line of the other brake circuit when said one brake circuit fails with a consequent loss in pressure in the output line thereof,
a first return line leading from said valve housing at a position spaced from any of said input and output lines for returning portions of the brake fluid in said first brake circuit from said first output line to a source which supplies said first input line,
and a second return line leading from said valve housing at a position spaced from said first return line and any of said input and output lines for returning portions of the brake fluid in said second brake circuit from said second output line to a source which supplies said second input line.

26. An installation according to claim 26, wherein said control piston means also includes means for automatically closing off the communication between the return line and output line of said brake circuit which fails by way of the pressure buildup in the output line of the other brake circuit.

27. An installation according to claim 26, wherein said control piston means includes a first central piston slidably mounted in a cylinder bore of said valve housing and second and third end pistons disposed at respective opposite ends of said first piston and slidably guided in said cylinder bore and in said first piston, and wherein said first piston includes first passage means for communicating said first input line with said first output line and second passage means for communicating said second input line with said second output line when said first piston is in a central position corresponding to normal operations with both brake circuits intact.

28. An installation according to claim 27, wherein said second piston is movable between a first position for blocking communication between said first output line and said first return line and a second position for permitting communication between said first output line and said first return line, said second piston being in said first position when said first brake circuit is inoperative and a pressure buildup occurs at said second output line.

29. An installation according to claim 28, wherein said third piston is movable between a first position for blocking communication between said second output line and said second return line and a second position for permitting communication between said second output line and said second return line, said third piston being in said first position when said second brake circuit is inoperative and a pressure buildup occurs at said first output line.

30. An installation according to claim 27, wherein said respective output lines lead radially into said cylinder bore, and wherein peripheral radially outwardly facing surface portions of said first piston close off respective ones of said output lines when said first piston is moved a predetermined amount from said central position upon failure of the brake circuit associated with the output line being closed.

31. An installation according to claim 29, wherein said respective output lines lead radially into said cylinder bore, and wherein peripheral radially outwardly facing surface portions of said first piston close off respective ones of said output lines when said first piston is moved a predetermined amount from said central position upon failure of the brake circuit associated with the output line being closed.

32. A safety installation for controlling brake fluid flow from a plurality of separately supplied brake fluid input lines to a corresponding plurality of brake fluid output lines which lead respectively to a corresponding plurality of independently actuable wheel brake cylinders at a wheel to be braked; said installation comprising:

a control valve housing, first and second separately supplied brake fluid input lines leading into said valve housing, first and second output lines leading out of said valve housing for separately supplying brake fluid pressure to respective first and second independently actuable wheel brake cylinders at a wheel to be braked, and control piston means movably disposed in said valve housing and including means for permittting communication of said first input line with said first output line and of said second input line with said second output line when approximately equal brake fluid pressure buildup is experienced in said first and second output lines corresponding to normally functioning respective first and second brake circuits containing said respective first and second output lines, said control piston means including further means for automatically closing off the communication of the respective input and output lines of one of said brake circuits by way of the pressure buildup in the output line of the other brake circuit when said one brake circuit fails with a consequent loss in pressure in the output line thereof, wherein said control piston means includes a first central piston slidably mounted in a cylinder bore of said valve housing, and wherein said first central piston includes first passage means for communicating said first input line with said first output line and second passage means for communicating said second input line with said second output line when said first piston is in a central position corresponding to normal operations with both brake circuits intact.

33. An installation according to claim 32, wherein said respective output lines lead radially into said cylinder bore, and wherein peripheral radially outwardly facing surface portions of said first piston close off respective ones of said output lines when said first piston is moved a predetermined amount from said central position upon failure of the brake circuit associated wtih the output line being closed.

34. An installation according to claim 32, wherein said first and second passage means include respective centrally disposed openings extending in the direction of movement of said first piston from respective positions adjacent said inlet lines to respective extreme outer ends of said first piston, said extreme outer ends being adjacent respective ones of said outlet lines when said first piston is in said central position.

35. A safety installation according to claim 33, characterized in that the first piston is retained in its respective position by a detent means.

36. A safety installation according to claim 35, characterized in that the detent means includes a contact switch which is actuated by dislacement of the first piston and which indicates the closing off of the inoperable brake circuit means by the closing of an electric circuit mens for a warning device.

37. A safety installation according to claim 36, characterized in that the contact switch is included in the detent means.

* * * * *